United States Patent
Kim et al.

(10) Patent No.: US 8,514,770 B2
(45) Date of Patent: Aug. 20, 2013

(54) METHOD OF ESTABLISHING UPLINK IN MOBILE SATELLITE COMMUNICATION SYSTEM

(75) Inventors: Hee Wook Kim, Daejeon (KR); Kunseok Kang, Daejeon (KR); Do-Seob Ahn, Daejeon (KR); Ho Jin Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 794 days.

(21) Appl. No.: 12/612,311

(22) Filed: Nov. 4, 2009

(65) Prior Publication Data

US 2010/0157880 A1   Jun. 24, 2010

(30) Foreign Application Priority Data

Dec. 19, 2008  (KR) ......................... 10-2008-0130489

(51) Int. Cl.
*H04B 7/185*   (2006.01)

(52) U.S. Cl.
USPC ........... 370/316; 370/208; 370/280; 370/329; 370/344; 370/503; 455/427; 455/456.1

(58) Field of Classification Search
USPC ................. 370/208, 329, 316, 280, 344, 503; 455/427

See application file for complete search history.

(56) References Cited

U.S. PATENT DOCUMENTS

| | | | |
|---|---|---|---|
| 8,169,955 B2 * | 5/2012 | Ansari et al. .................. | 370/329 |
| 2007/0252761 A1 * | 11/2007 | Koorapaty et al. ........... | 342/464 |
| 2007/0293214 A1 | 12/2007 | Ansari et al. | |
| 2008/0019306 A1 * | 1/2008 | Damnjanovic ................ | 370/329 |

FOREIGN PATENT DOCUMENTS

| | | |
|---|---|---|
| KR | 10-2002-0069317 | 8/2002 |
| KR | 10-0706410 | 4/2007 |
| WO | 03/051070 A1 | 6/2003 |

* cited by examiner

*Primary Examiner* — Christopher Grey
(74) *Attorney, Agent, or Firm* — Staas & Halsey LLP

(57) ABSTRACT

Provided is a method of establishing an uplink in a mobile satellite communication system, the method including: receiving a random uplink access signal from terminals included in a coverage of a satellite beam; estimating a location of each of the terminals; calculating an uplink transmission point in time when each of the terminals transmits an uplink signal, based on the estimated location of each of the terminals; transmitting, to each of the terminals, the calculated uplink transmission point in time; and receiving the uplink signal from each of the terminals at the calculated uplink transmission point in time.

6 Claims, 13 Drawing Sheets

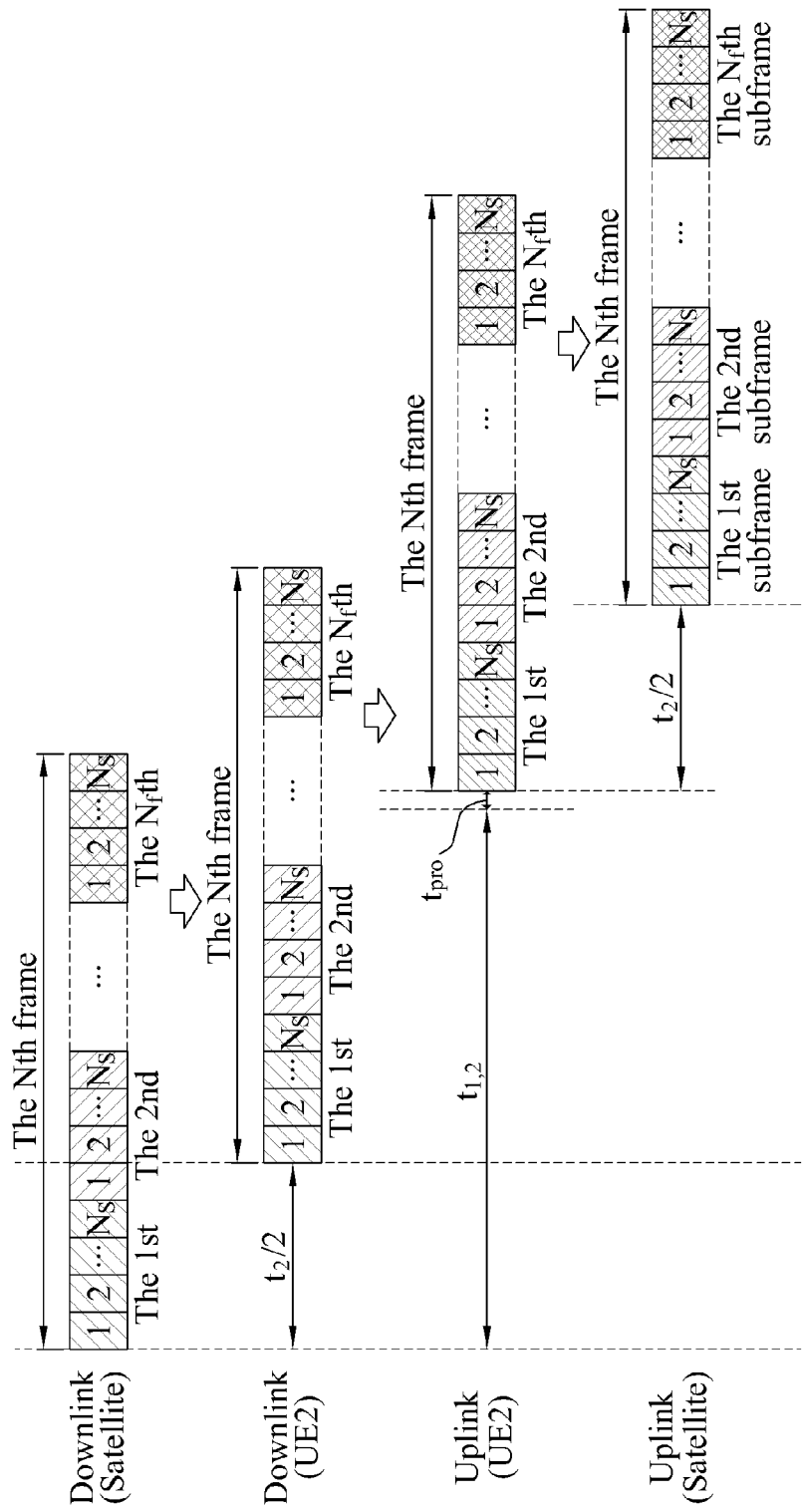

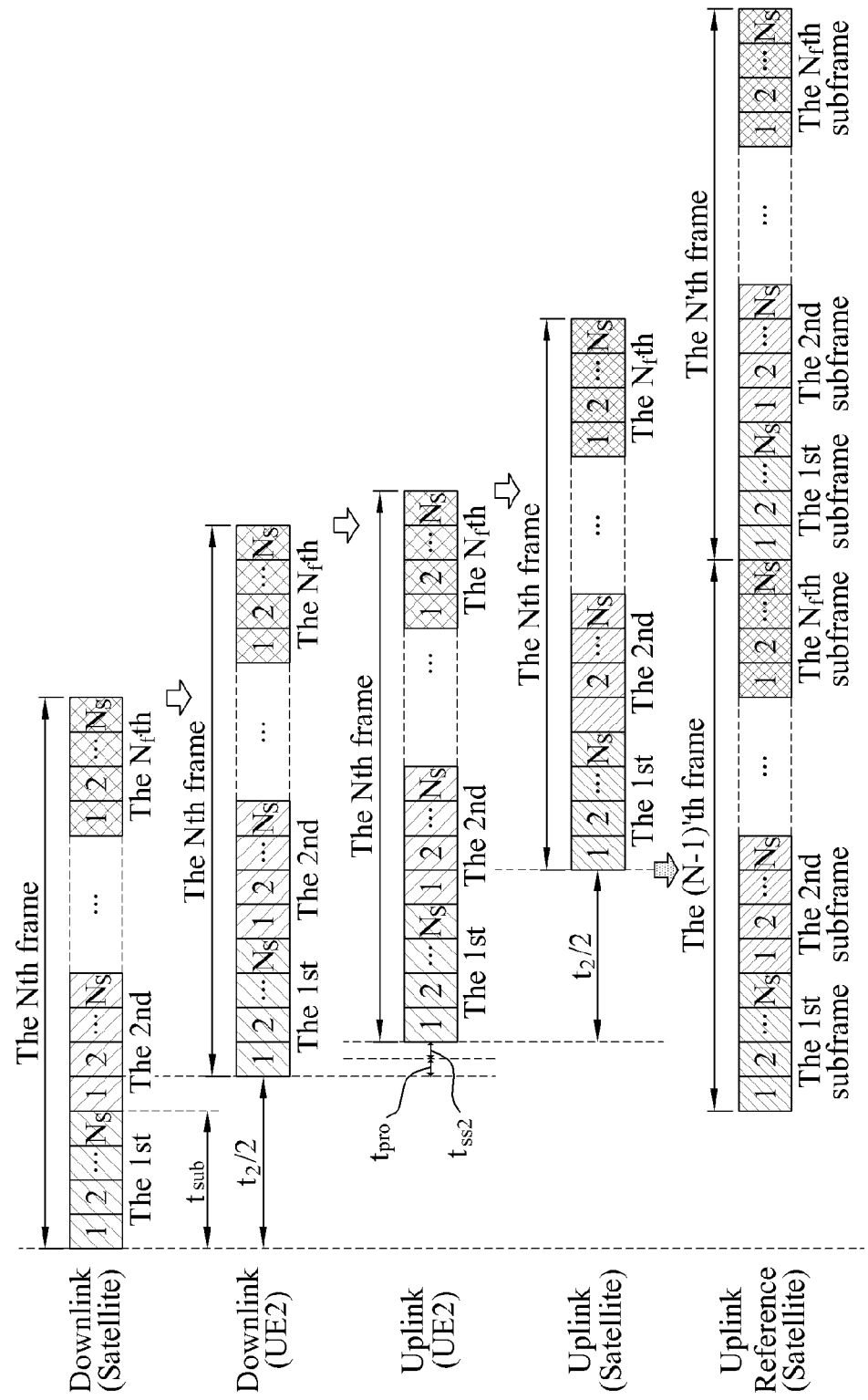

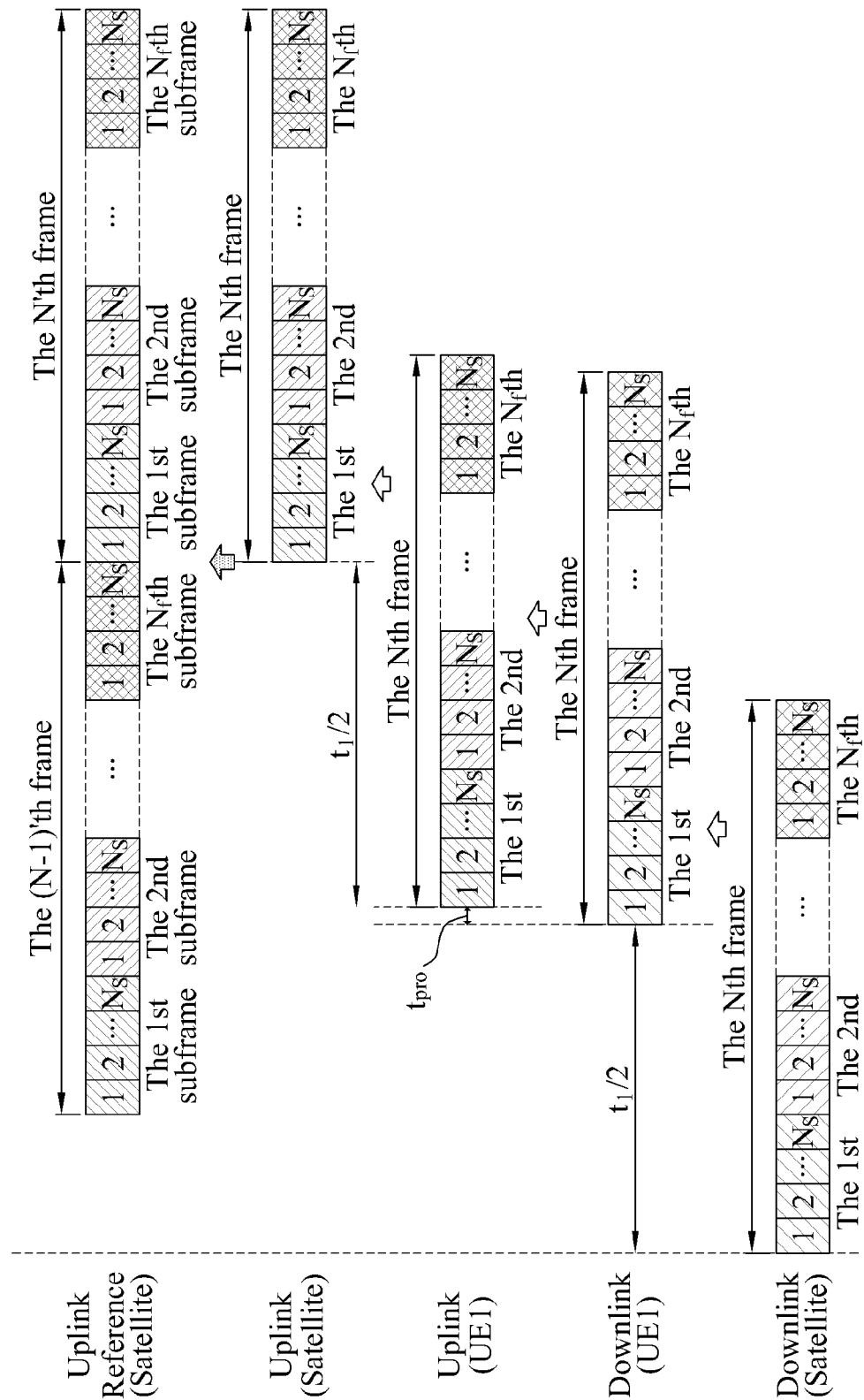

METHOD OF ESTABLISHING UPLINK IN MOBILE SATELLITE COMMUNICATION SYSTEM

CROSS-REFERENCE TO RELATED APPLICATION

This application claims the benefit of Korean Patent Application No. 10-2008-0130489, filed on Dec. 19, 2008, in the Korean Intellectual Property Office, the disclosure of which is incorporated herein by reference.

BACKGROUND

1. Field of the Invention

The present invention relates to a method of establishing an uplink in a mobile satellite communication system. More particularly, the present invention relates to a method of establishing an uplink that enables a terminal to calculate a delay time to thereby synchronize an uplink signal, or enables the terminal to transmit an uplink signal at an uplink transmission point in time calculated by a satellite, in a mobile satellite communication system of an orthogonal frequency division multiple access (OFDMA) scheme or a single carrier frequency division multiple access (SC-FDMA) scheme.

2. Description of the Related Art

A mobile satellite communication system may use a Complementary Terrestrial Component (CTC) such as a repeater, a Complementary Ground Component (CGC), and an Ancillary Terrestrial Component (ATC). As a mobile satellite communication system, a Digital Multimedia Broadcasting (DMB) service is being provided in Korea, and researches regarding a Digital Video Broadcasting-Satellite services to Handhelds (DVB-SH) system are active in European countries in order to provide a broadcasting service from around 2010. Also, MSV and TerreStar of America are developing an integrated terrestrial satellite system for providing voice and data communications in urban areas and suburbs using the ATC.

The satellite DMB system of Korea is designed to additionally adopt a terrestrial network using, both a satellite and the same channel gapfiller to thereby enable a user to receive enhanced audio signals and multimedia signals using a receiver for a vehicle, a fixed terminal, or a mobile terminal. The satellite DMB system of Korea may be optimized in a band of 2630 MHz to 2655 MHz of the satellite and a terrestrial part. The satellite DMB system may include a feeder link earth station, a broadcasting satellite, two types of terrestrial repeaters, and a receiver, for example, a receiver for a vehicle, a fixed terminal, or a mobile terminal. Signals may be transmitted to the satellite via the feeder link earth station. In this instance, a Fixed Satellite Service (FSS) band, for example, 14 GHz may be used for an upward link. The received signals may be converted to the band of 2.6 GHz in the satellite, and be amplified to a desired level through an amplifier of a satellite repeater and thereby be broadcast to a service area. A system user may need to receive signals via a miniature antenna with a low directivity. For this, there is a need for a sufficient level of equivalent isotropically radiated power. Therefore, the satellite may need to include a large transmit antenna and a high power repeater. Major shortcomings found from a signal propagation in the band of 2.6 GHz may include an obstacle in a direct path from the satellite, and a shadowing. To overcome the shortcomings, a repeater to retransmit a satellite signal is added in a system design. This repeater is in charge of a portion occluded by an obstacle, for example, a building and the like. The repeater may be classified into a direct amplification repeater and a frequency converting repeater. The direct amplification repeater simply amplifies a broadcast signal of 2.6 GHz. Generally, a low gain amplifier may be used to avoid an unnecessary emission caused by signal interference between a receive antenna and a transmit antenna. The low gain amplifier is in charge of a relatively small region of up to 500 m based on a Line of Sight (LOS). The frequency converting repeater is in charge of a relatively large region of up to 3 km, and may convert the received signal of 2.6 GHz to a signal of a different frequency band, for example, 11 GHz and thereby transmit the converted signal. In this environment, a multi-path fading phenomenon where at least two signals are received may occur. In order to stably receive a multi-path fading signal, the satellite DMB system may use a rake receiver that is applied with a Code Division Multiplexing (CDM) technology.

The DVB-SH system of European countries may be a system that uses a satellite in the nationwide coverage and also uses a CGC in an indoor environment or a terrestrial coverage. The DVB-SH system aims to provide a mobile TV service in the bandwidth of 15 MHz of S band based on DVB-H. Since a band adjacent to a terrestrial International Mobile Telecommunication (IMT) band of the S band is used, an integration with a terrestrial IMT part may be readily performed. In addition, the terrestrial network may also be easily reused and thus costs may be reduced. The DVB-SH system considers a hybrid broadcasting structure with the terrestrial network. Also, in order to decrease signal interference between the satellite and the CGC, and to effectively use frequency resources, the DVB-SH system considers a structure where a reuse factor is set to "1" with respect to a CGC cell within a single satellite spot beam, and a reuse factor is set to "3" with respect to the satellite spot beam. In this case, in France, it is possible to broadcast, using the satellite spot beam, nine TV channels covering the entire nation, or to broadcast 27 channels via the terrestrial repeater in an urban area or in an indoor environment.

MSV and TerreStar of America are developing a geostationary orbit (GEO) based mobile satellite communication system in order to provide a personal communication service (PCS)/cellular terminal with a ubiquitous wireless wide area network service such as an Internet access, a voice communication, and the like in L band and S band. In America and Canada, by using a hybrid radio network structure where a satellite and an ATC are integrated, the GEO-mobile satellite communication system may provide a voice service or a high speed packet service via the ATC, that is, a terrestrial network in urban areas or populated areas, and may also provide a service via the satellite in suburbs or countryside not covered by the ATC. The ATC is in development to provide a satellite service without significantly increasing a complexity of a terrestrial terminal using a radio interface similar to a radio interface of the satellite, and the like.

A personal mobile satellite communication system to be developed aims to provide a service via a satellite in suburbs or countryside where a LOS is guaranteed, and to provide the service via an ATC in urban areas or indoor environments where a satellite signal is not guaranteed. Also, in order to decrease a chip set cost of a terminal, it may be important to design a radio interface of the satellite and a radio interface of the terrestrial terminal have some commonality. However, unique characteristics of the satellite, for example, a long propagation round trip delay time, a relatively large spot beam coverage, and the like may need to be minimized in order to reuse the radio interference of the terrestrial terminal for the satellite.

SUMMARY

An aspect of the present invention provides a method of establishing an uplink in a mobile satellite communication system.

Another aspect of the present invention also provides a method of establishing an uplink that enables a terminal to calculate a delay time to thereby synchronize an uplink signal, or enables the terminal to transmit an uplink signal at an uplink transmission point in time calculated by a satellite, in a mobile satellite communication system of an orthogonal frequency division multiple access (OFDMA) scheme or a single carrier frequency division multiple access (SC-FDMA) scheme.

Another aspect of the present invention also provides a method of establishing an uplink that enables a terminal to calculate a longest delay time, using location information estimated by a satellite, to thereby synchronize an uplink signal, in a mobile satellite communication system of an OFDMA scheme or an SC-FDMA scheme.

Another aspect of the present invention also provides a method of establishing an uplink that enables a satellite to calculate an uplink transmission point in time of each of terminals based on a delay time of each of the terminals that is estimated based on location information, and thereby enables a corresponding terminal to transmit an uplink signal at the calculated uplink transmission point in time in a mobile satellite communication system of an OFDMA scheme or an SC-FDMA scheme.

According to an aspect of the present invention, there is provided a method of establishing an uplink in a satellite of a mobile satellite communication system, the method including: receiving a random uplink access signal from terminals included in a coverage of a satellite beam; estimating a location of each of the terminals; calculating an uplink transmission point in time when each of the terminals transmits an uplink signal, based on the estimated location of each of the terminals; transmitting, to each of the terminals, the calculated uplink transmission point in time; and receiving the uplink signal from each of the terminals at the calculated uplink transmission point in time.

According to another aspect of the present invention, there is provided a method of establishing an uplink in a terminal of a mobile satellite communication system, the method including: transmitting a random uplink access signal to a satellite; receiving, from the satellite, downlink control information that includes an uplink transmission point in time of a corresponding terminal; verifying the uplink transmission point in time; and transmitting an uplink signal to the satellite at the uplink transmission point in time.

According to still another aspect of the present invention, there is provided a method of establishing an uplink in a satellite of a mobile satellite communication system, the method including: receiving a random uplink access signal from terminals included in a coverage of a satellite beam; estimating a location of each of the terminals; transmitting location information associated with the terminals to the terminals using downlink control information; and receiving a synchronized uplink signal from each of the terminals.

According to yet another aspect of the present invention, there is provided a method of establishing an uplink in a terminal of a mobile satellite communication system, the method including: transmitting a random uplink access signal to a satellite; receiving, from the satellite, downlink control information that includes location information associated with terminals included in a coverage of a satellite beam; verifying the location information; calculating a delay time of a farthest terminal from the satellite and a delay time of a corresponding terminal; and calculating a difference between the delay time of the farthest terminal and the delay time of the corresponding terminal; and transmitting an uplink signal to the satellite by delaying the uplink signal by the calculated difference.

EFFECT

According to embodiments of the present invention, there may be provided a method of establishing an uplink in a mobile satellite communication system, the method including: receiving a random uplink access signal from terminals included in a coverage of a satellite beam; estimating a location of each of the terminals; calculating an uplink transmission point in time when each of the terminals transmits an uplink signal, based on the estimated location of each of the terminals; transmitting, to each of the terminals, the calculated uplink transmission point in time; and receiving the uplink signal from each of the terminals at the calculated uplink transmission point in time. Through this, it is possible to establish the uplink by considering a very long propagation delay time difference between terminals in a beam coverage of the mobile satellite communication system.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which:

FIG. 4A is a diagram illustrating a process of establishing an uplink between a satellite and a terminal having a shortest propagation delay time together with a transmitted/received signal according to an embodiment of the present invention;

FIG. 8A is a diagram illustrating a process of establishing an uplink between a satellite and a terminal having a shortest propagation delay time based on a symbol unit, together with a transmitted/received signal, according to an embodiment of the present invention;

FIG. 9B is a diagram illustrating a process of establishing an uplink between a satellite and a terminal having a longest propagation delay time based on a symbol unit, together with a transmitted/received signal, according to an embodiment of the present invention.

DETAILED DESCRIPTION

Figure 1:
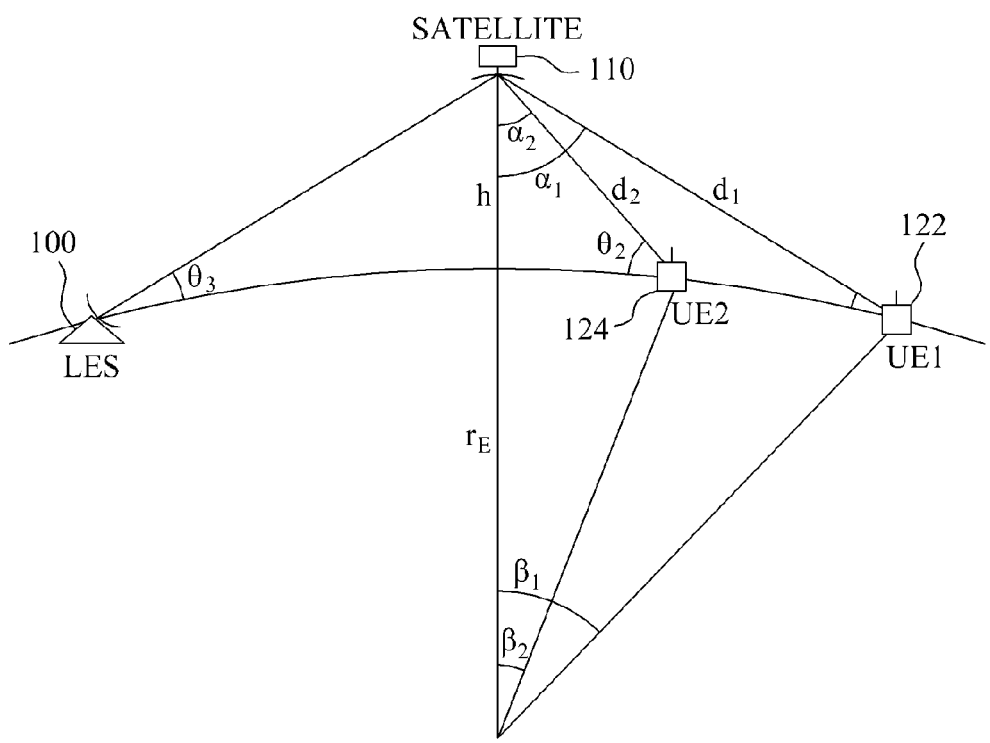
FIG. 1 is a diagram illustrating a mobile satellite communication system having a propagation delay time difference based on a location of a terminal and a satellite in a single spot beam coverage according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

Hereinafter, embodiments of the present invention will be described in detail with reference to the accompanying drawings. When it is determined detailed description related to a known function or configuration they may render the purpose of the present invention unnecessarily ambiguous in describing the present invention, the detailed description will be omitted here.

According to an embodiment of the present invention, there is provided a method of establishing an uplink that enables a terminal to calculate a delay time to thereby synchronize an uplink signal, or enables the terminal to transmit an uplink signal at an uplink transmission point in time calculated by a satellite, in a mobile satellite communication system.

Although the present invention is described based on an uplink mobile satellite communication system of an orthogonal frequency division multiple access (OFDMA) scheme or a single carrier frequency division multiple access (SC-FDMA) scheme, the present invention is not limited thereto or restricted thereby. The present invention may be applicable to a code division multiple access (CDMA) scheme, a time division multiple access (TDMA) scheme, and the like.

FIG. 1 is a diagram illustrating a mobile satellite communication system having a propagation delay time difference based on a location of each of terminals (UE1, UE2) 122 and 124 and a satellite 110 in a single spot beam coverage according to an embodiment of the present invention.

Referring to FIG. 1, the mobile satellite communication system may include an earth station (LES) 100, the satellite 110, and the terminals (UE1, UE2) 122 and 124. Parameters of FIG. 1 may be verified to calculate a delay time difference of the terminals (UE1, UE2) 122 and 124.

In FIG. 1, h denotes a satellite height, $r_E$ denotes a radius of the earth, d denotes a distance between the satellite 110 and each of the terminals (UE1, UE2) 122 and 124, a denotes an angle at which each of the terminals (UE1, UE2) 122 and 124 is located based on a vertical surface with respect to the satellite 110, $\beta$ denotes an angle at which each of the terminals (UE1, UE2) 122 and 124 is located based on the vertical surface with respect to the center of the earth, and $\theta$ denotes an elevation angle at each of the terminals (UE1, UE2) 122 and 124, or at the LES 100.

Here, it is assumed that the LES 100 and the terminal (UE1) 122 are located at the edge of a satellite coverage, and the terminal (UE2) 124 is located closer to a center of the satellite coverage using the above defined parameters. Propagation delay time $t_1$ and $t_2$ between the satellite 110 and the terminals (UE1, UE2) 122 and 124, and a delay time difference $\Delta t_{1,2}$ may be obtained as follows.

When $\theta_1$ is defined as a minimum elevation angle, $\beta_1$ is defined as a satellite coverage angle, $\alpha_{1,2}$ is equal to $\alpha_1 - \alpha_2$ and is defined as a spot beam angle having a maximum size, and $\beta_{1,2}$ is equal to $\beta_1 - \beta_2$ and is defined as a spot beam coverage angle having a maximum size, a relationship between the coverage angle and the elevation angle may be expressed by the following Equation 1:

$$\beta_i = \arccos\left(\frac{r_E}{r_E + h}\cos\theta_i\right) - \theta_i. \quad \text{[Equation 1]}$$

With respect to the maximum spot beam, a relationship between a spot beam coverage diameter $s_{1,2}$ according to an earth surface and the maximum spot beam coverage angle $\beta_{1,2}$ may be expressed by the following Equation 2:

$$s_{1,2} = 2\pi r_E \frac{\beta_{1,2}}{360°}. \quad \text{[Equation 2]}$$

Also, the distance between the satellite 110 and each of the terminals (UE1) 122 and 124 may have the following relationship:

$$d_i = \sqrt{r_E^2 + (r_E + h)^2 - 2r_E(r_E + h)\cos\beta_i} \quad \text{[Equation 3]}$$

When the satellite height h, the minimum elevation angle $\theta_1$, the beam coverage diameter $s_{1,2}$, and the earth radius $r_E$ are given, and the satellite-terminal distance d are obtained from the above Equation 3, the propagation delay time $t_i$ may be expressed by the following Equation 4:

$$t_i = d_i/c \quad \text{[Equation 4]}$$

where c denotes a propagation speed.

Also, the delay time difference $\Delta t_{1,2}$ may be given by the following Equation 5:

$$\Delta t_{1,2} = t_1 - t_2 \quad \text{[Equation 5]}$$

The above delay time difference may vary according to the satellite height and the spot beam coverage. In the case of a low earth orbit (LEO) satellite, the delay time difference may be within the beam coverage range of 1000 km to a few meters. In the case of a geostationary orbit (GEO) satellite, the delay time difference may exceed 10 ms.

In a Long Term Evolution (LTE) system, when it is considered that the length of a frame is 10 ms and the length of a subframe is 1 ms, the above delay time difference may be great and thus the LTE system may not use an uplink communication scheme like a terrestrial system.

Specifically, unlike a terrestrial communication system, in the mobile satellite communication system, a coverage of a single spot beam is very large in comparison to a terrestrial cell and thus a propagation delay time difference between terminals may not be disregarded. The propagation delay time difference between the terminals may have a different value depending on the size of the spot beam and the satellite height, however, may generally have a value from a few ms to tens of ms. Accordingly, it may exceed a single subframe time in an LTE frame structure, or may be a relatively long period of time that may exceed a frame time. In the case of an uplink not considering the delay time difference, a synchronization may not be performed. Accordingly, the present invention proposes a method of establishing an uplink based on a long round-trip delay time difference between terminals in the mobile satellite communication system. The proposed uplink establishing method may be performed generally using two schemes.

In a first scheme, a terminal may initiatively transmit a synchronized uplink signal based on a delay time to thereby establish an uplink. In a second scheme, a satellite may initiatively provide, to each of terminals, an uplink transmission point in time when each of the terminals transmits an uplink signal, to thereby establish an uplink.

Hereinafter, a method of establishing an uplink, which is initiated by a terminal, will be described with reference to FIGS. 2 through 4.

Figure 2:
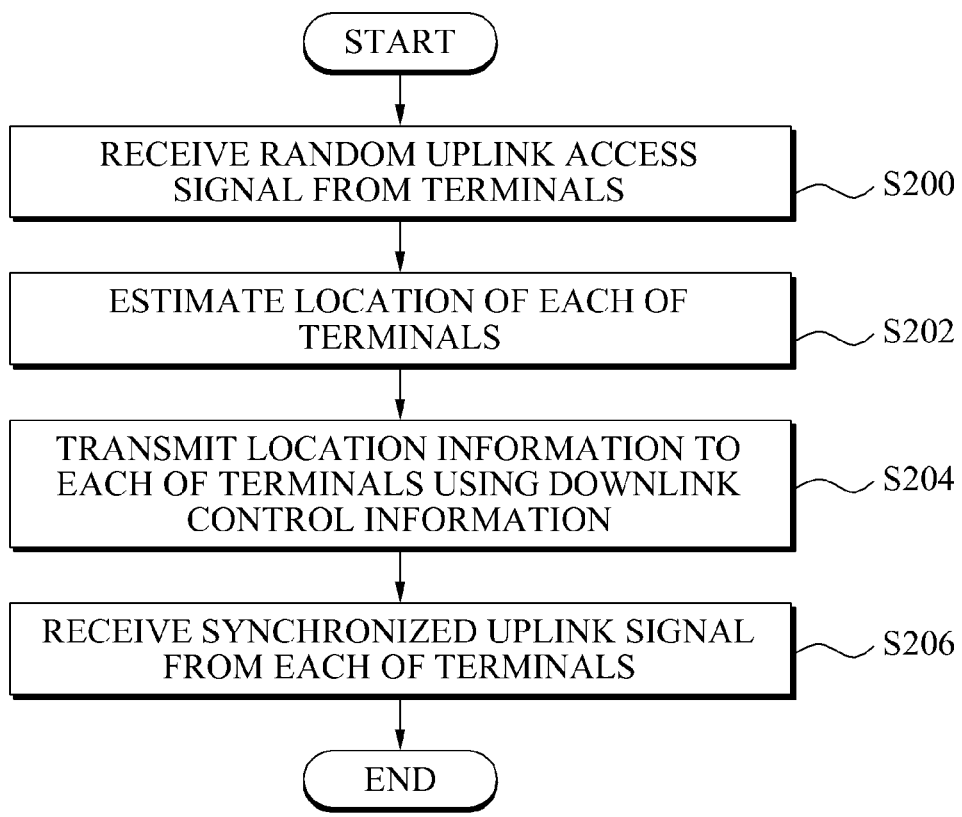
FIG. 2 is a flowchart illustrating a method of establishing a terminal initiative uplink in a satellite of a mobile satellite communication system according to an embodiment of the present invention.

FIG. 2 is a flowchart illustrating a method of establishing a terminal initiative uplink in a satellite of a mobile satellite communication system according to an embodiment of the present invention.

Referring to FIG. 2, in the mobile satellite communication, the satellite may receive a random uplink access signal from terminals included in a coverage of a satellite beam in operation S200. In operation S202, the satellite may estimate a location of each of the terminals. In operation S204, the satellite may transmit location information associated with the terminals to the terminals using downlink control information. Here, the downlink control information may include an uplink Media Access Protocol (MAP) or header, a Physical Downlink Control Channel (PDCCH), and the like.

In operation S206, the satellite may receive a synchronized uplink signal from each of the terminals. Here, the uplink signal is synchronized with an uplink of a terminal that is located farthest away from the satellite.

The aforementioned method may be performed by an earth station via the satellite.

Figure 3:
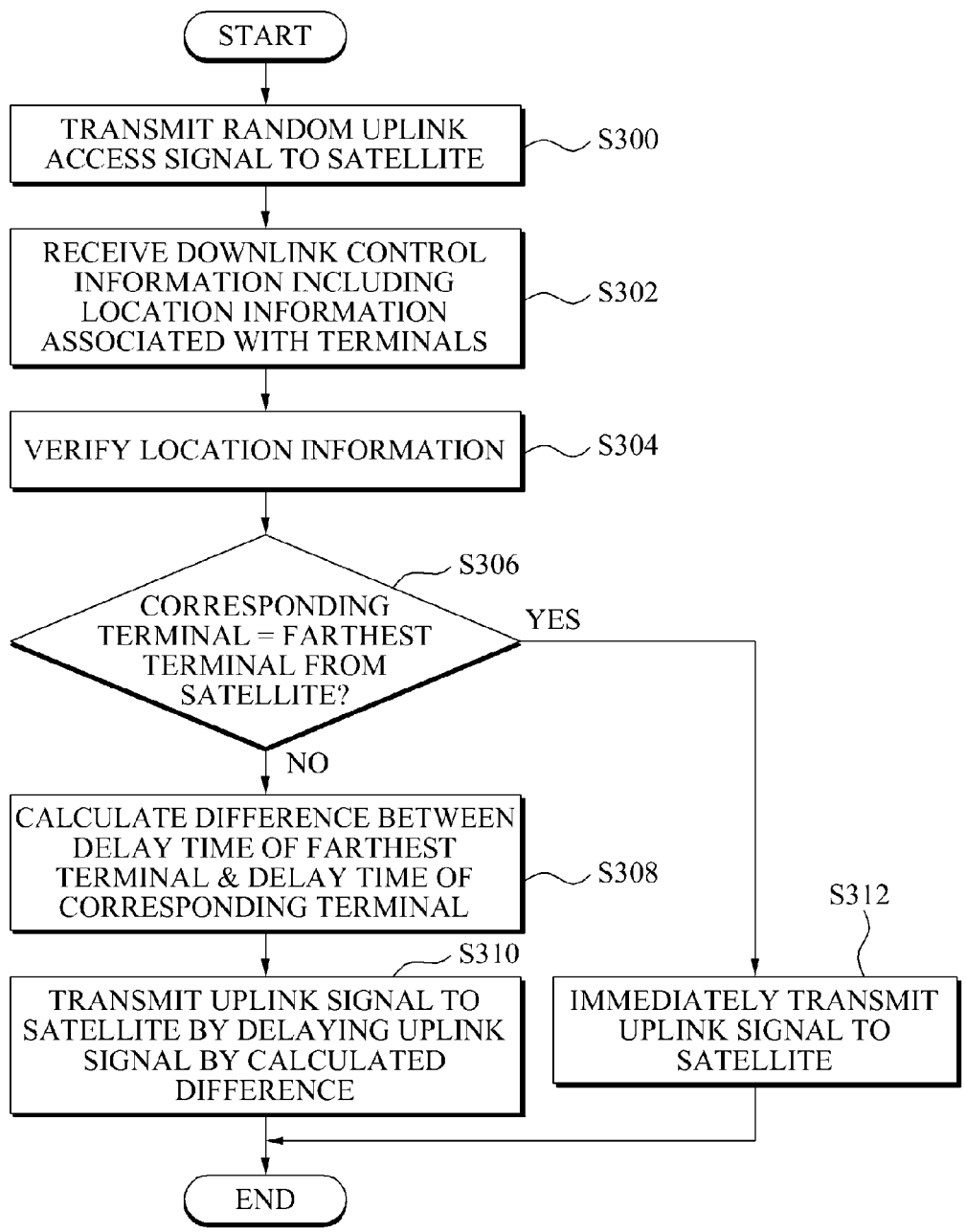
FIG. 3 is a flowchart illustrating a method of establishing a terminal initiative uplink in a terminal of a mobile satellite communication system according to an embodiment of the present invention.

FIG. 3 is a flowchart illustrating a method of establishing a terminal initiative uplink in a terminal of a mobile satellite communication system according to an embodiment of the present invention.

Referring to FIG. 3, in the mobile satellite communication system, the terminal may transmit a random uplink access signal to a satellite in operation S300. In operation S302, the terminal may receive, from the satellite, downlink control information that includes location information associated with terminals included in a coverage of a satellite beam. In operation S304, the terminal may verify the location information.

In operation S306, the terminal may verify whether a corresponding terminal is a farthest terminal from the satellite, based on the location information. When the corresponding terminal does not correspond to the farthest terminal from the satellite in operation S306, the terminal may calculate a difference between a delay time of the farthest terminal and a delay time of the corresponding terminal in operation S308.

In operation S310, the terminal may transmit an uplink signal to the satellite by delaying the uplink signal by the calculated difference.

Conversely, when the corresponding terminal corresponds to the farthest terminal from the satellite in operation S306, the terminal may immediately transmit the uplink signal to the satellite without a delay time.

FIG. 4A is a diagram illustrating a process of establishing an uplink between a satellite and a terminal UE2 having a shortest propagation delay time together with a transmitted/received signal according to an embodiment of the present invention.

Figure 4B:
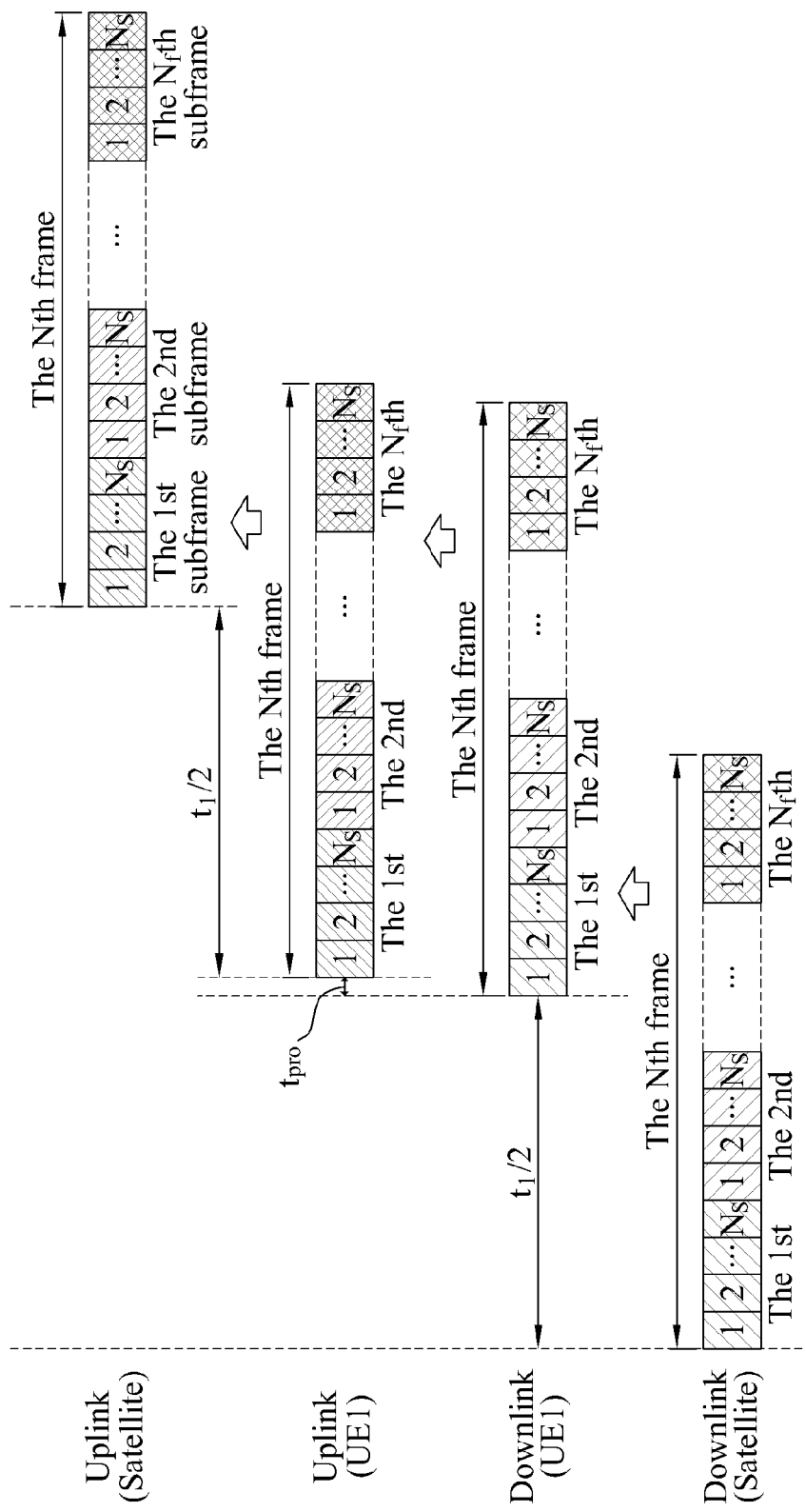
FIG. 4B is a diagram illustrating a process of establishing an uplink between a satellite and a terminal having a longest propagation delay time together with a transmitted/received signal according to an embodiment of the present invention.

FIG. 4B is a diagram illustrating a process of establishing an uplink between a satellite and a terminal UE1 having a longest propagation delay time together with a transmitted/received signal according to an embodiment of the present invention.

In FIGS. 4A and 4B, white shaded arrow indicators sequentially indicate, for each terminal, a process where the satellite transmits a downlink signal and an uplink signal is transmitted to the satellite.

Referring to FIGS. 4A and 4B, the terminal UE2 is located in the center of a beam coverage and has the shortest propagation delay time. Therefore, a signal transmitted from the satellite or an earth station for the terminal UE2 may be received by the terminal UE2 prior to any other terminals included in a spot beam. The terminal UE1 is located at the edge of the beam coverage and has the longest propagation delay time. Therefore, a signal transmitted from the satellite or the earth station for the terminal UE1 may be received by the terminal UE1 later than any other terminals included in the spot beam. As described above, the reception time difference between the terminals UE1 and UE2 may reach a few subframes or a few frames.

Accordingly, in order to guarantee an orthogonality of an OFDM or SC-FDMA uplink, a synchronization may need to be performed for signals transmitted from the satellite or the earth station to the terminals UE1 and UE2 included in the spot beam. The terminal UE1 that last receives a downlink signal may need to immediately transmit an uplink signal to the satellite or the earth station without causing a delay, by receiving the downlink signal based on an aspect that a signal is received by the terminal UE1 last, and by considering a time that is required to obtain information used to transmit the uplink signal, and a signal processing time.

The above transmission and reception time interval of the terminal UE1 may be set as a reference time interval for transmission or reception of another terminal. The reference time interval may be arbitrarily set, or may be simply set based on a terminal with a longest transmission delay time. The terminal UE2 may receive the downlink signal first, but may need to transmit the uplink signal to the satellite or the earth station last due to the reference signal interval, that is, a time when the signal of the terminal UE1 reaches the satellite or the earth station.

In the case of a terrestrial LTE system, the above delay time difference may occur in a single subframe and thus only time information having a difference in the single subframe may be transferred. However, in the case of the satellite, the delay time difference may exceed the single subframe time and thus delay time information to be transmitted to a downlink may be further required for the satellite in comparison to the ground. Accordingly, in addition to delay time difference information in a single frame, information regarding that the delay time difference corresponds to how may subframes or frames may also need to be additionally transmitted.

For example, in the case of the terminal UE2, a propagation delay time difference with the terminal UE1, that is, the delay time difference $t_{1,2}$ with the reference time interval may be expressed by the following Equation 6:

$$t_{1,2} = N_{sub,2} * t_{sub} + t_{sf2} \qquad \text{[Equation 6]}$$
$$= N_{fr,2} * t_{fr} + N'_{sub,2} * t_{sub} + t_{sf2},$$

where $t_{sub}$ denotes a subframe length, $t_{fr}$ denotes a frame length, $t_{sf2}$ denotes a length of a remaining delay time after calculating, by the terminal UE2, a delay time based on a frame unit and a subframe unit, $N_{fr,2}$ denotes N frames that may need to be included as a delay time in the terminal UE2, and $N'_{sub,2}$ denotes N' subframes that may need to be included as the delay time in the terminal UE2.

In the terminal initiative uplink establishing method described above with reference to FIGS. 2 through 4, other terminals may need to wait until a terminal with a longest delay time transmits a signal, which results in wasting resources. In this case, the entire system processing amount and a service quality such as voice data sensitive to a latency may be deteriorated. Hereinafter, a method of establishing a satellite initiative uplink according to an embodiment of the present invention will be described with reference to FIGS. 5 through 9.

Figure 5:
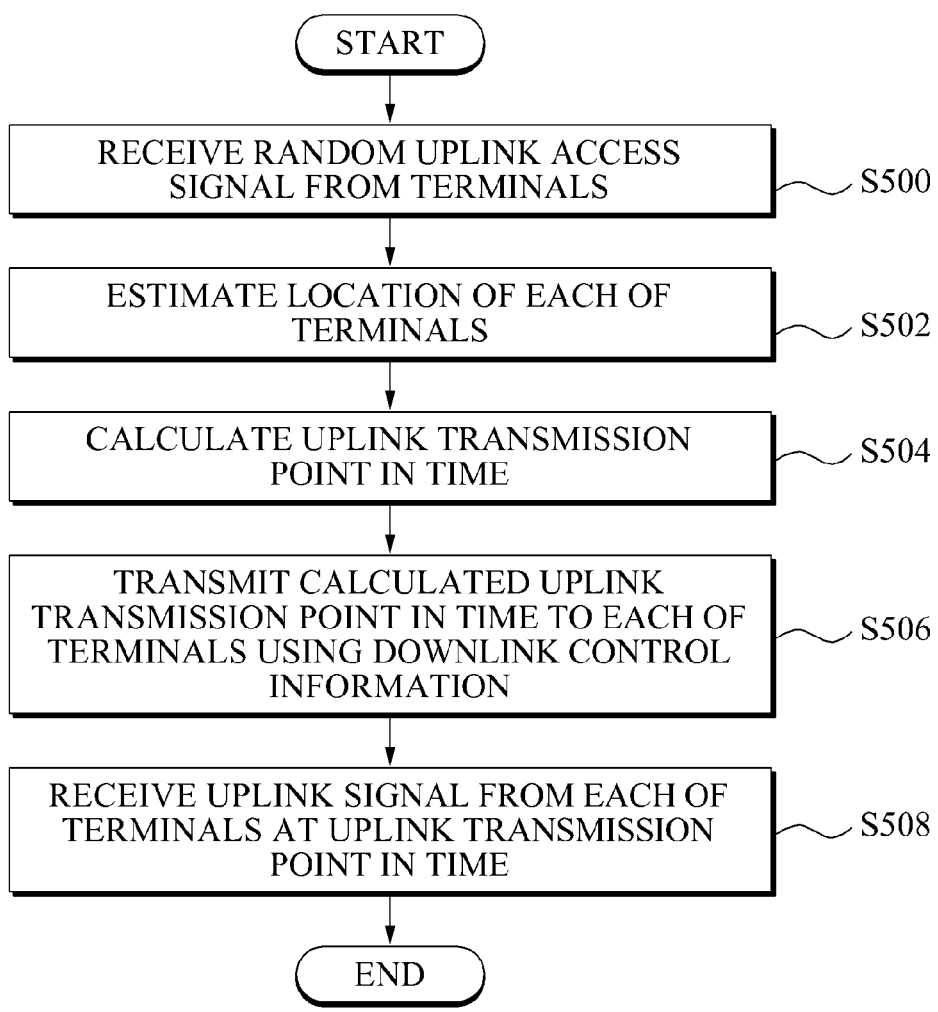
FIG. 5 is a flowchart illustrating a method of establishing a satellite initiative uplink in a satellite of a mobile satellite communication system according to an embodiment of the present invention.

FIG. 5 is a flowchart illustrating a method of establishing a satellite initiative uplink in a satellite of a mobile satellite communication system according to an embodiment of the present invention.

Referring to FIG. 5, in the mobile satellite communication system, the satellite may receive a random uplink access signal from terminals included in a coverage of a satellite beam in operation S500. In operation S502, the satellite may estimate a location of each of the terminals. In operation S504, the satellite may calculate an uplink transmission point in time when each of the terminals transmits an uplink signal, based on the estimated location of each of the terminals.

In operation S506, the satellite may transmit, to each of the terminals, the calculated uplink transmission point in time, using downlink control information. Here, the downlink control information may include an uplink MAP or header, a PDCCH, and the like.

The calculated uplink transmission point in time may be set to perform a synchronization based on a frame unit, a subframe unit, or a symbol unit. When the uplink transmission point in time is set to perform a synchronization based on the symbol unit, interference may occur due to an inconsistent synchronization between subframes. In order to solve the interference, the satellite may verify a symbol interval where the interference occurs, include interference symbol interval information in the downlink control information, and thereby provide the downlink control information to the terminal.

In operation S508, the satellite may receive the uplink signal from each of the terminals at the calculated uplink transmission point in time.

The method described above with reference to FIG. 5 may be performed by an earth station via the satellite.

Figure 6:
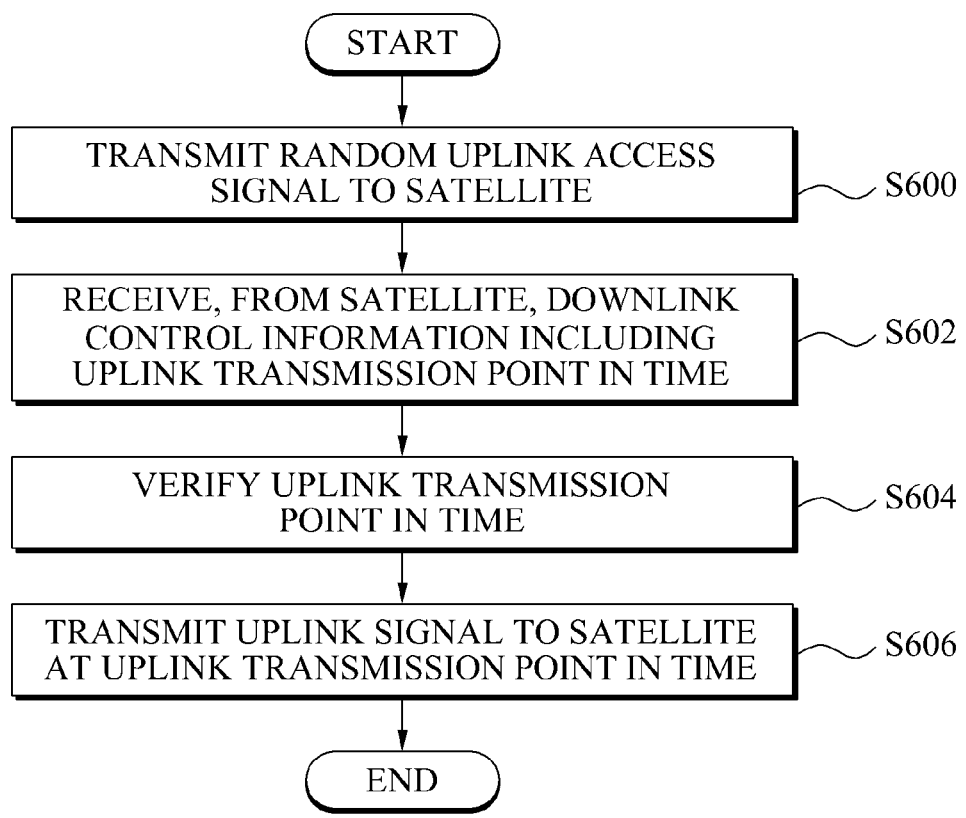
FIG. 6 is a flowchart illustrating a method of establishing a satellite initiative uplink in a terminal of a mobile satellite communication system according to an embodiment of the present invention.

FIG. 6 is a flowchart illustrating a method of establishing a satellite initiative uplink in a terminal of a mobile satellite communication system according to an embodiment of the present invention.

Referring to FIG. 6, in the mobile satellite communication system, the terminal may transmit a random uplink access signal to a satellite in operation S600. In operation S602, the terminal may receive, from the satellite, downlink control information that includes an uplink transmission point in time of a corresponding terminal.

The calculated uplink transmission point in time may be set to perform a synchronization based on a frame unit, a subframe unit, or a symbol unit. When the uplink transmission point in time is set to perform a synchronization based on the symbol unit, interference may occur due to an inconsistent synchronization between subframes. In this instance, the terminal may additionally receive interference symbol interval information regarding a symbol where the inference occurs.

In operation S604, the terminal may verify the uplink transmission point in time. In operation S606, the terminal may transmit an uplink signal to the satellite at the uplink transmission point in time.

When the terminal establishes the uplink with the satellite based on the symbol unit, the terminal may transmit the uplink signal without allocating a resource to a symbol corresponding to the interference symbol interval, in operation S606.

A case where an uplink synchronization is performed based on a subframe unit and a symbol unit according to an embodiment of the present invention will be described with reference to FIGS. 7 through 9. In FIGS. 7 through 9, white arrow indicators sequentially indicate, for each terminal, a process where a satellite transmits a downlink signal and an uplink signal is transmitted to the satellite. Shaded arrow indicators indicate a point in time when a synchronization is performed for each unit based on a reference uplink signal determined by the satellite.

Figure 7A:
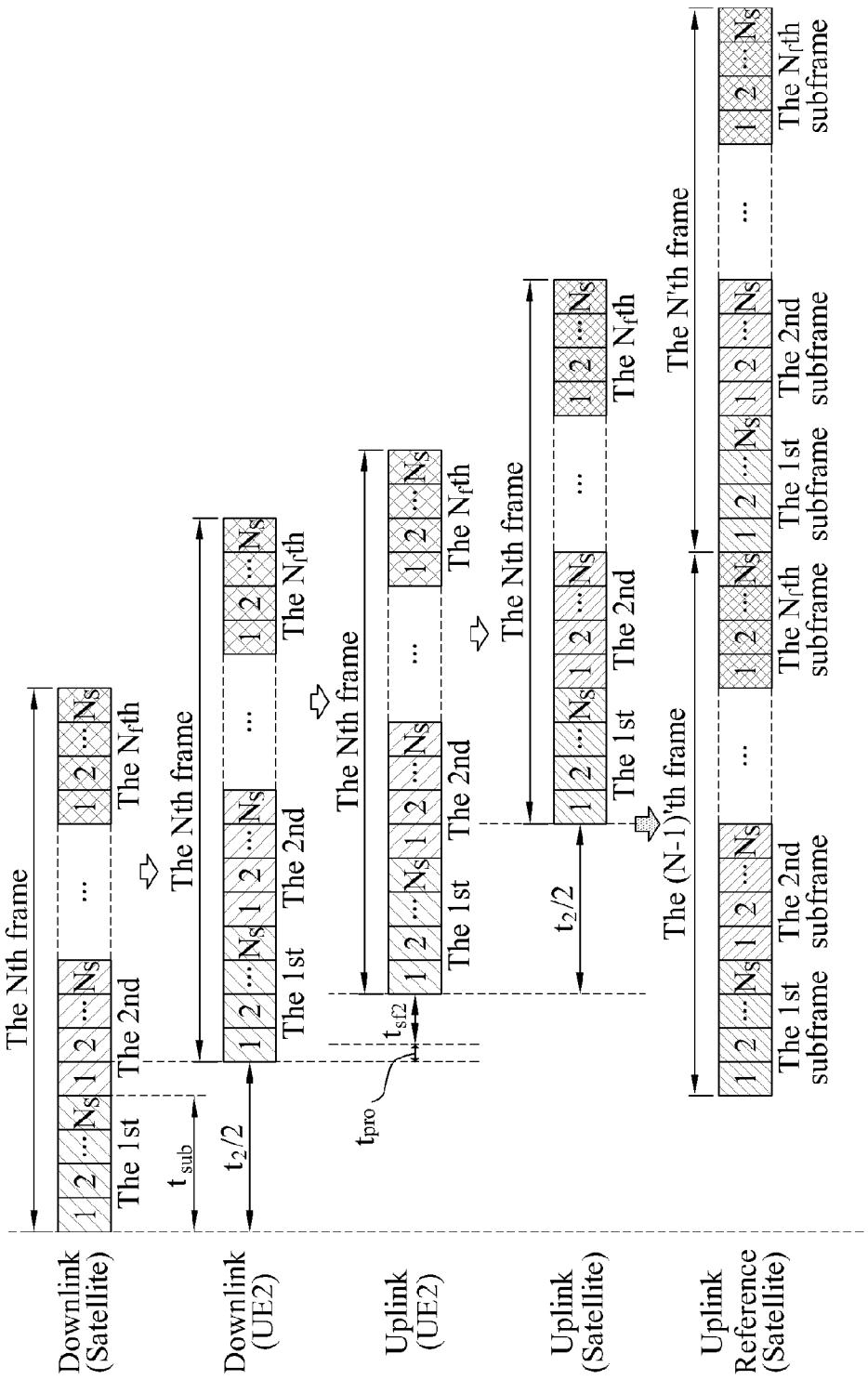
FIG. 7A is a diagram illustrating a process of establishing an uplink between a satellite and a terminal having a shortest propagation delay time based on a subframe unit, together with a transmitted/received signal, according to an embodiment of the present invention.
Figure 7B:
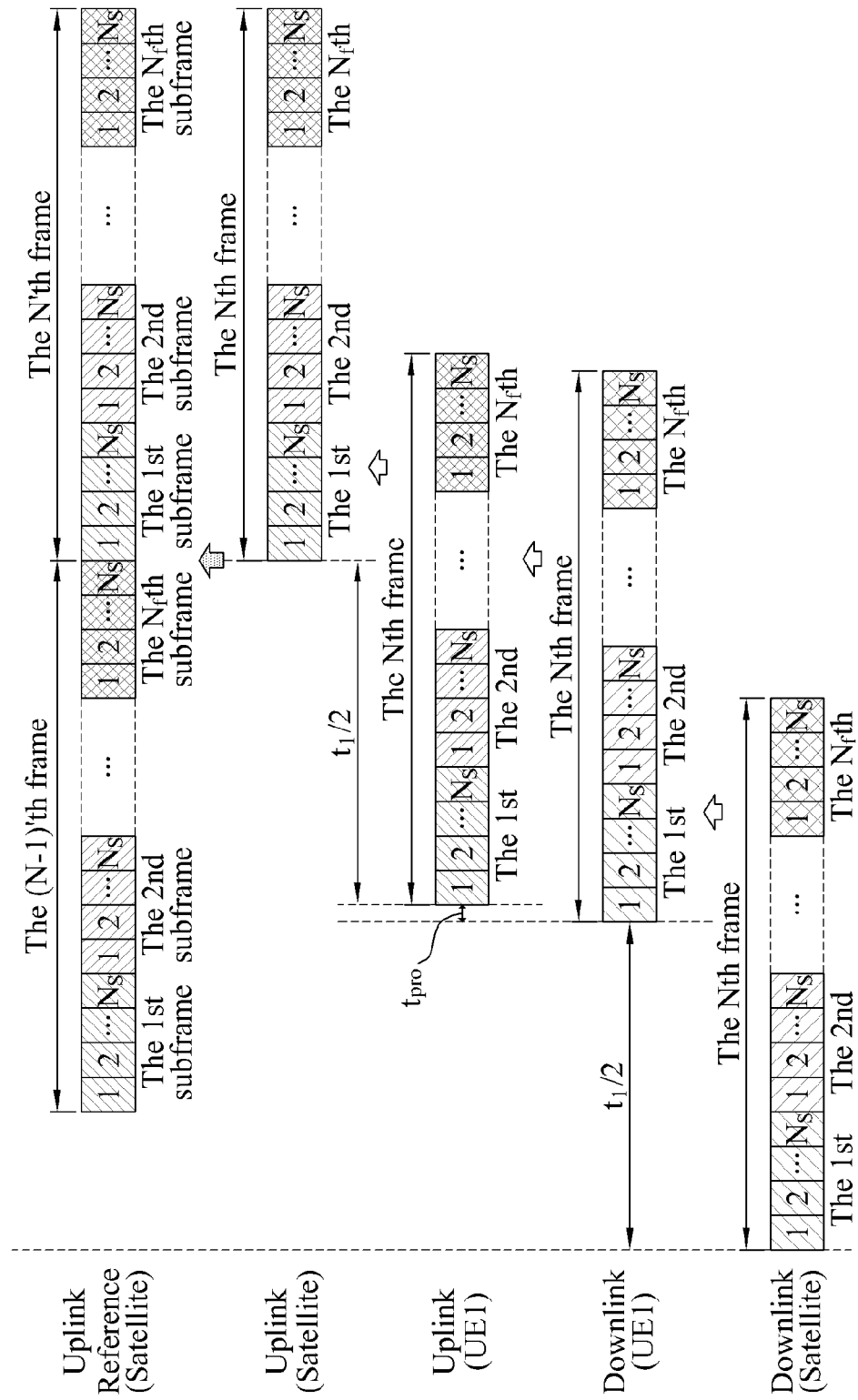
FIG. 7B is a diagram illustrating a process of establishing an uplink between a satellite and a terminal having a longest propagation delay time based on a subframe unit, together with a transmitted/received signal, according to an embodiment of the present invention.

FIG. 7A is a diagram illustrating a process of establishing an uplink between a satellite and a terminal UE2 having a shortest propagation delay time based on a subframe unit, together with a transmitted/received signal, according to an embodiment of the present invention FIG. 7B is a diagram illustrating a process of establishing an uplink between a satellite and a terminal UE1 having a longest propagation delay time based on a subframe unit, together with a transmitted/received signal, according to an embodiment of the present invention.

Referring to FIGS. 7A and 7B, the terminal UE2 may most initially receive a downlink signal transmitted from the satellite or an earth station, among terminals included in a spot beam. The satellite or the earth station may verify a propagation delay time of each of the terminals based on terminal location information that is obtained from a random access of the terminals. The satellite may determine and allocate an uplink transmission point in time of each of the terminals.

The uplink transmission point in time may be arbitrarily determined by the satellite, but may be determined by setting, as a reference time interval, a transmission and reception time interval of the terminal UE1 with a longest delay time. Hereinafter, a transmission and reception of the terminal UE2 of FIGS. 7A and 7B will be described based on the reference time interval. The terminal UE2 may receive a downlink signal from the satellite or the earth station after a period of time of $t_2/2$ elapses. The terminal UE2 may obtain uplink transmission information from the downlink signal. After a period of time of $t_{pro}$ for processing an uplink signal elapses, the terminal UE2 may prepare to transmit the uplink signal to the satellite or the earth station.

When an uplink synchronization is performed based on the subframe unit, the satellite may set the uplink transmission point in time so that a resource for the terminal UE2 may be allocated to a subframe, capable of transmitting the uplink signal most quickly from the reference time, at a point in time where the downlink signal is transmitted to the terminal UE2.

Since the satellite is aware of information associated with propagation delay time $t_1$ and $t_2$ of the terminals UE1 and UE2, propagation delay time difference $t_{1,2}$ between the terminals UE1 and UE2 may be expressed by the above Equation 6.

This is because the satellite is aware of $N_{sub,2}$, $N_{fr,2}$, $N'_{sub,2}$, and $t_{sf2}$. When the transmission and reception time interval of the terminal UE1 is set as the reference time interval, an existing scheme may match a transmission interval of the uplink transmission signal of the terminal UE2 in a first subframe of an $N^{th}$ frame of the reference time interval. However, since the satellite is aware of the above delay time information, the satellite may transmit uplink information for the terminal UE2 in a $(N_{sub,2}+1)^{th}$ subframe of a $(N-N_{fr,2}-1)^{th}$ frame of the reference time interval, so that a resource may be allocated to perform a synchronization for a signal for the terminal UE2 and a reference signal from $(t_{pro}+t_{sf2})$ immediately after the downlink signal is transmitted from the satellite to the terminal UE2. The same scheme may be applied to other terminals UEi that are included within the spot beam.

When the uplink synchronization is performed as above, a resource allocation may be performed with respect to each terminal based on the subframe unit in the terrestrial network. Therefore, in the case of a satellite system, subframe and frame information for the uplink synchronization and the resource allocation based on a propagation delay time difference between terminals may also need to be transmitted in addition to a resource allocation symbol location and a subframe location in each subframe required for the resource allocation. However, when the uplink synchronization is performed as above, an upper layer may transmit only the aforementioned information to thereby may perform the uplink synchronization and the resource allocation according to the same process as the ground. Accordingly, it is possible to adopt a terrestrial radio interface standard as is without correcting a physical layer standard of a radio interface.

FIG. 8A is a diagram illustrating a process of establishing an uplink between a satellite and a terminal UE2 having a shortest propagation delay time based on a symbol unit, together with a transmitted/received signal, according to an embodiment of the present invention.

Figure 8B:
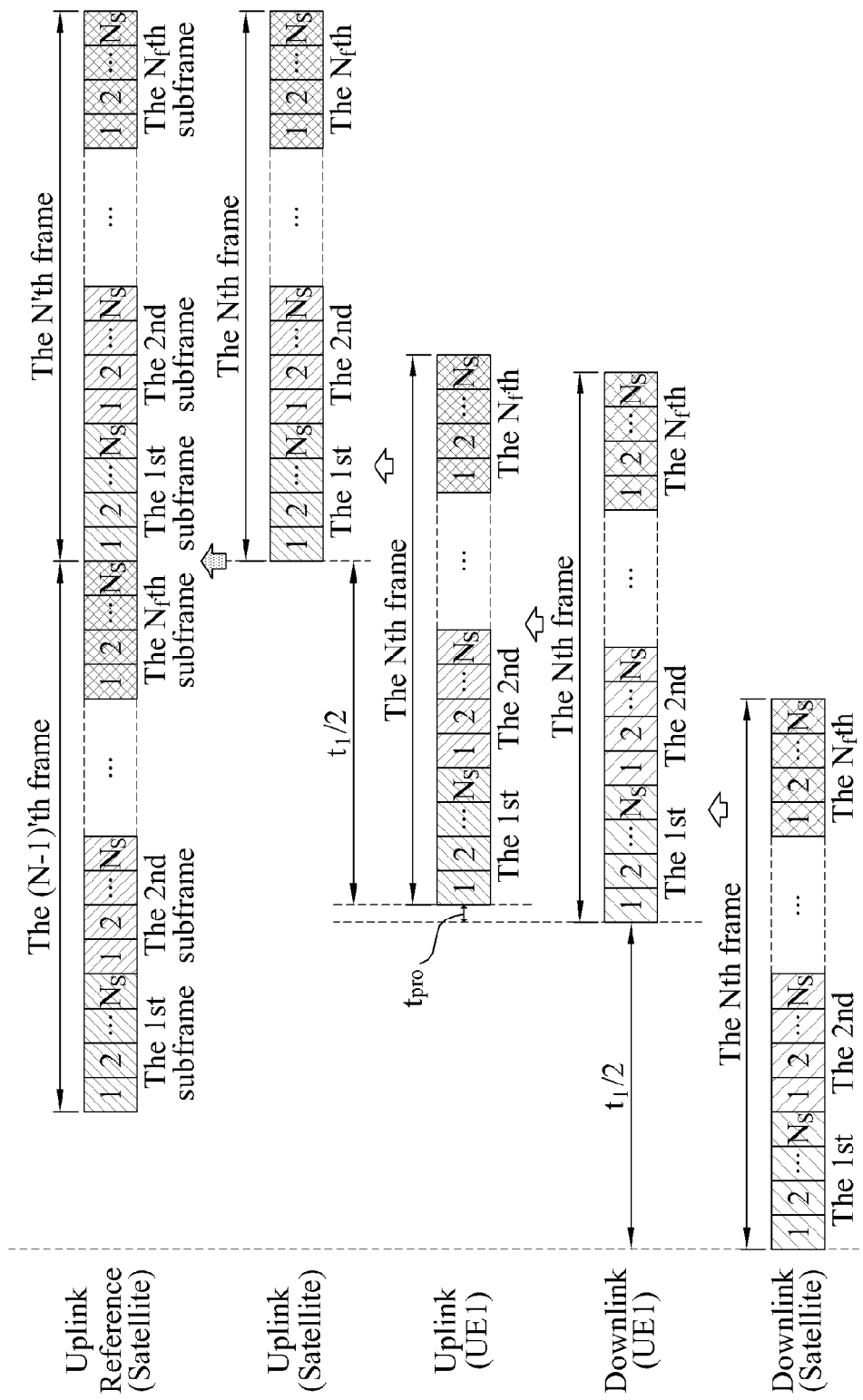
FIG. 8B is a diagram illustrating a process of establishing an uplink between a satellite and a terminal having a longest propagation delay time based on a symbol unit, together with a transmitted/received signal, according to an embodiment of the present invention.

FIG. 8B is a diagram illustrating a process of establishing an uplink between a satellite and a terminal UE1 having a longest propagation delay time based on a symbol unit, together with a transmitted/received signal, according to an embodiment of the present invention;

Referring to FIGS. 8A and 8B, when the uplink is established based on the symbol unit under the same condition as the condition of FIG. 7, a propagation delay time difference between the terminals UE1 and UE2 may be expressed by the following Equation 7:

$$\begin{aligned}
t_{1,2} &= N_{sub,2} * t_{sub} + t_{sf2} \quad \text{[Equation 7]}\\
&= N_{sub,2} * t_{sub} + N_{sym,2} * t_{sym} + t_{ss2}\\
&= N_{fr,2} * t_{fr} + N'_{sub,2} * t_{sub} + t_{sf2}\\
&= N_{fr,2} * t_{fr} + N'_{sub,2} * t_{sub} + N_{sym,2} * t_{sym} + t_{ss2},
\end{aligned}$$

where $t_{sub}$ denotes a subframe length, $t_{fr}$ denotes a frame length, $t_{ss2}$ denotes a length of the remaining delay time after calculating, by the terminal UE2, a delay time based on a frame unit, a subframe unit, and a symbol unit, $t_{sym}$ denotes a length of a single OFDM or SC-FDMA symbol interval, $N_{fr,2}$ denotes N frames that may need to be included as a delay time in the terminal UE2, $N'_{sub,2}$ denotes N' subframes that may need to be included as the delay time in the terminal UE2, and $N_{sym,2}$ denotes N symbols that may need to be included as the delay time in the terminal UE2.

The satellite may be aware of $N_{sub,2}$, $N_{fr,2}$, $N'_{sub,2}$, $N_{sym,2}$, and $t_{ss2}$. Specifically, since the satellite is aware of the above delay time information, the satellite may set an uplink transmission point in time of the terminal UE2, so that a resource may be allocated to perform an uplink synchronization for a reference signal from $(t_{pro}+t_{ss2})$ after the terminal UE2 receives the downlink signal. More particularly, the satellite may set the uplink transmission point in time of the terminal UE2 so that an uplink signal for the terminal UE2 may be transmitted from an $(N_{sym,2}+1)^{th}$ symbol of an $N_{sub,2}^{th}$ subframe of an $(N-N_{fr,2}-1)^{th}$ frame of the reference time interval.

The same scheme may be applied to other terminals UEi included in the spot beam.

A scheme of performing a synchronization based on a symbol unit, as shown in FIGS. 8A and 8B, may consume a relatively smaller amount of resources. However, the above scheme may perform the synchronization based on the symbol unit. Therefore, when a physical channel signal operates based on the subframe unit, a subframe synchronization between signals of terminals may be inconsistent, which may impede the satellite or the earth station from accurately receiving the physical channel signal. The scheme of FIGS. 8A and 8B may be used when each channel or symbols independently operate based on the symbol unit. When the synchronization is performed based on the symbol unit, and then each channel or the signals operate based on the subframe unit, the signals may be transmitted using the following scheme of FIGS. 9A and 9B.

Figure 9A:
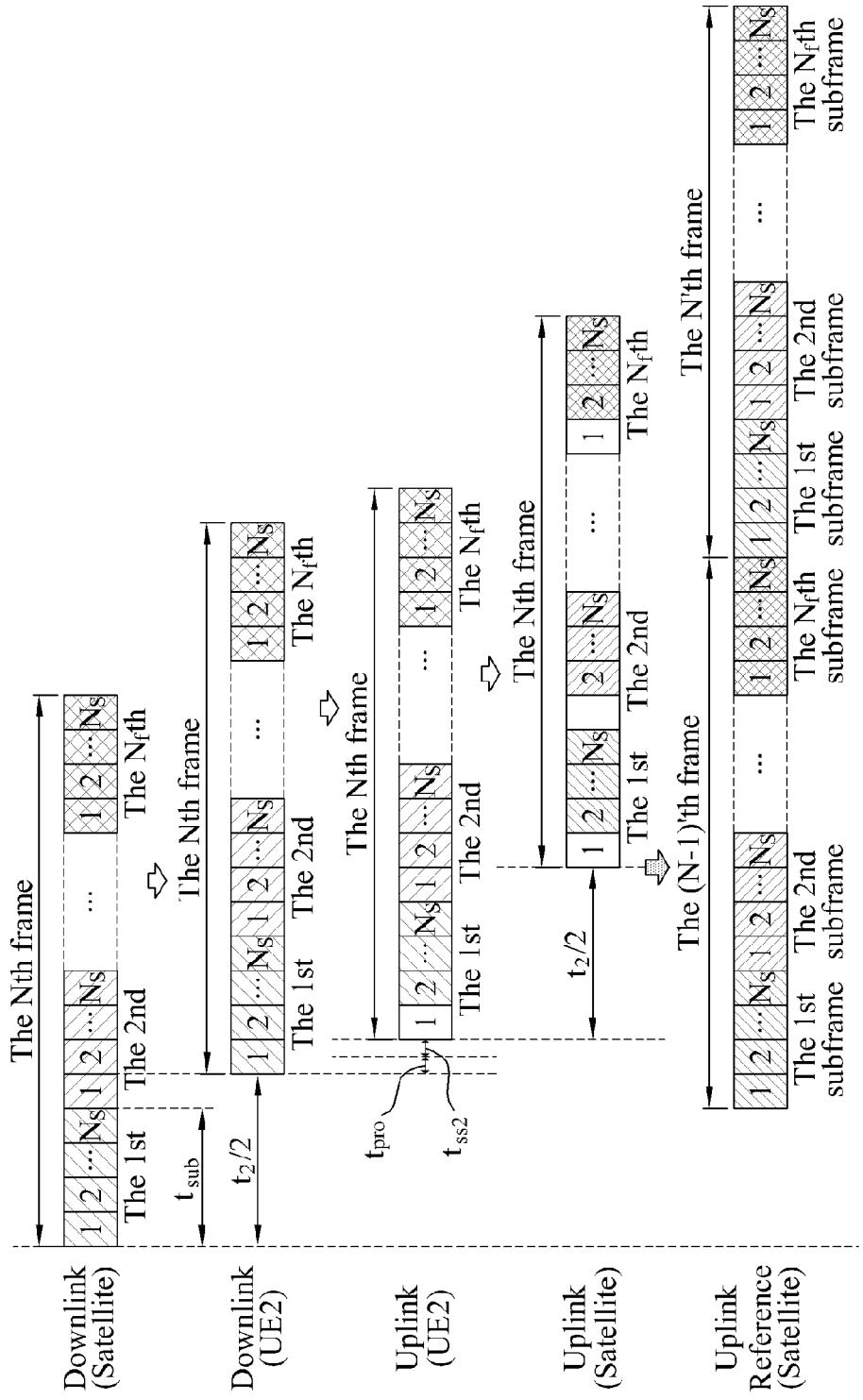
FIG. 9A is a diagram illustrating a process of establishing an uplink between a satellite and a terminal having a shortest propagation delay time based on a symbol unit, together with a transmitted/received signal, according to an embodiment of the present invention.

FIG. 9A is a diagram illustrating a process of establishing an uplink between a satellite and a terminal UE2 having a shortest propagation delay time based on a symbol unit, together with a transmitted/received signal, according to an embodiment of the present invention.

FIG. 9B is a diagram illustrating a process of establishing an uplink between a satellite and a terminal UE1 having a longest propagation delay time based on a symbol unit, together with a transmitted/received signal, according to an embodiment of the present invention.

In order to solve interference caused by an inconsistent synchronization subframes under the same condition as the condition of FIGS. 8A and 8B, FIGS. 9A and 9B shows an example of not allocating a resource with respect to the inconsistent synchronization.

For example, in the case of the terminal UE2, Ns symbols from "1" to Ns exist in a single subframe transmission interval of an uplink of the terminal UE2. When a synchronization is performed based on the symbol unit by using a signal transmission and reception interval of the terminal UE1 as a signal reference interval, a first symbol and second through Ns$^{th}$ symbols may be received in another subframe interval by the satellite or the earth station. Accordingly, when a signal for the terminal UE2 is not transmitted in a first symbol interval, the terminal UE2 may receive only control information associated with a subframe corresponding to second through Ns$^{th}$ symbol intervals. Also, interference does not occur in a subframe transmitted in the first symbol interval.

The above scheme may prevent resources from being forcefully allocated in some of symbol intervals of a single subframe and thus may waste the resources. However, the above scheme may be effectively used for services such as a voice service where a latency is more important than a data rate.

As described above, according to an embodiment of the present invention, there is provided a method of performing an uplink synchronization in a mobile satellite communication system using concepts of a symbol, a subframe, and a frame of an LTE system. However, the present invention is not limited thereto. Specifically, the concepts of the symbol, the subframe, and the frame may be modified to be suitable for a frame structure of each system.

The above-described exemplary embodiments of the present invention may be recorded in computer-readable media including program instructions to implement various operations embodied by a computer. The media may also include, alone or in combination with the program instructions, data files, data structures, and the like. The described hardware devices may be configured to act as one or more software modules in order to perform the operations of the above-described exemplary embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A method of establishing an uplink in a satellite of a mobile satellite communication system, the method comprising:
    receiving a random uplink access signal from terminals included in a coverage of a satellite beam;
    estimating a location of each of the terminals;
    calculating an uplink transmission point in time when each of the terminals transmits an uplink signal, based on the estimated location of each of the terminals;
    transmitting, to each of the terminals, the calculated uplink transmission point in time;
    receiving the uplink signal from each of the terminals at the calculated uplink transmission point in time, wherein the calculating comprises calculating the uplink transmission point in time to synchronize uplink signals, transmitted from the terminals, based on the symbol unit; and
    verifying a symbol interval where interference occurs due to an inconsistent synchronization between subframes, and transmitting interference symbol interval information to each of the terminals using downlink control information to not allocate a resource to the verified symbol interval, when the uplink transmission point in time is calculated to synchronize uplink signals, transmitted from the terminals, based on the symbol unit.

2. A method of establishing an uplink in a terminal of a mobile satellite communication system, the method comprising:
    transmitting a random uplink access signal to a satellite;
    receiving, from the satellite, downlink control information that includes an uplink transmission point in time of a corresponding terminal;
    verifying the uplink transmission point in time; and
    transmitting an uplink signal to the satellite at the uplink transmission point in time,
    wherein the uplink transmission point in time indicates a point in time that is set to synchronize uplink signals of terminals, included in a coverage of a satellite beam, based on a symbol unit,
    wherein, when the uplink transmission point in time is set to synchronize the uplink signals of terminals, included in the coverage of the satellite beam, based on the symbol unit, the method of establishing the uplink in the terminal of the mobile satellite communication system further comprises:
    receiving, from the satellite, interference symbol interval information of the corresponding terminal using the downlink control information; and
    transmitting, to the satellite, an uplink signal in which a resource is not allocated to a symbol corresponding to the interference symbol interval information.

3. The method of claim 2, wherein, when the satellite calculates the uplink transmission point in time to synchronize uplink signals, transmitted from the terminals, based on the symbol unit, the interference symbol interval information corresponds to a symbol interval where interference occurs due to an inconsistent synchronization between subframes of the terminals.

4. A method of establishing an uplink in a satellite of a mobile satellite communication system, the method comprising:
    receiving a random uplink access signal from terminals included in a coverage of a satellite beam;
    estimating a location of each of the terminals;
    transmitting location information associated with the terminals to the terminals using downlink control information; and
    receiving a synchronized uplink signal from each of the terminals,
    wherein each of the terminals calculates a delay time of a farthest terminal from the satellite and a delay time of a corresponding terminal, using the received location information, and transmits the uplink signal by delaying the uplink signal by a time corresponding to a difference between the delay time of the farthest terminal and the delay time of the corresponding terminal to thereby synchronize the uplink signal.

5. A method of establishing an uplink in a terminal of a mobile satellite communication system, the method comprising:
    transmitting a random uplink access signal to a satellite;
    receiving, from the satellite, downlink control information that includes location information associated with terminals included in a coverage of a satellite beam;
    verifying the location information;
    calculating a delay time of a farthest terminal from the satellite and a delay time of a corresponding terminal; and
    calculating a difference between the delay time of the farthest terminal and the delay time of the corresponding terminal; and
    transmitting an uplink signal to the satellite by delaying the uplink signal by the calculated difference.

6. The method of claim 5, further comprising:
    transmitting the uplink signal to the satellite without a delay time, when the corresponding terminal corresponds to the farthest terminal from the satellite as a result of the verifying of the location information.

* * * * *